(12) United States Patent
Sugiura

(10) Patent No.: US 8,456,642 B2
(45) Date of Patent: Jun. 4, 2013

(54) LASER GAUGE INTERFEROMETER

(75) Inventor: Keita Sugiura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 351 days.

(21) Appl. No.: 12/851,192

(22) Filed: Aug. 5, 2010

(65) Prior Publication Data

US 2011/0043819 A1 Feb. 24, 2011

(30) Foreign Application Priority Data

Aug. 21, 2009 (JP) ................................. 2009-192259

(51) Int. Cl.
*G01B 11/02* (2006.01)

(52) U.S. Cl.
USPC .......................................... 356/498; 356/499

(58) Field of Classification Search
USPC .......................................... 356/498, 489, 485
See application file for complete search history.

(56) References Cited

U.S. PATENT DOCUMENTS

| 4,984,891 A | | 1/1991 | Miyazaki et al. ............. 356/358 |
| 4,984,898 A | * | 1/1991 | Hofler et al. .................. 356/498 |
| 5,631,736 A | * | 5/1997 | Thiel et al. .................... 356/486 |
| 5,748,315 A | * | 5/1998 | Kawai et al. .................. 356/484 |

FOREIGN PATENT DOCUMENTS

JP H02-001501 1/1990

* cited by examiner

*Primary Examiner* — Tarifur Chowdhury
*Assistant Examiner* — Sunghee Y Gray
(74) *Attorney, Agent, or Firm* — Fitzpatrick, Cella, Harper & Scinto

(57) ABSTRACT

There is provided a laser gauge interferometer with high measurement precision, which uses laser beam interference, includes: a measurement interferometer which generates a measurement output corresponding to a displacement of a moving member; and a correction interferometer which generates a measurement output corresponding to a change in refractive index of air at a constant reference interval. An arithmetic processing device computes a measurement target displacement amount for which the influence of the change in refractive index of air is corrected. A correction laser beam from the correction interferometer passes through the measurement interferometer and thus travels on the same optical path as an optical path of a correction laser beam from the measurement interferometer to become interference light corresponding to the change in refractive index of air through which a measurement laser beam passes, and then enters the arithmetic processing device.

9 Claims, 8 Drawing Sheets

LASER GAUGE INTERFEROMETER

BACKGROUND OF THE INVENTION

1. Field of the Invention

The present invention relates to a laser gauge interferometer for measuring a displacement of a moving member at high precision.

2. Description of the Related Art

Up to now, a laser gauge interferometer has been known in which a measurement interferometer for generating a measurement output based on a displacement of a moving member which is an object to be measured and a correction interferometer for generating a measurement output based on a change in refractive index of air are combined to perform measurement while the influence of the change in refractive index of air is corrected (see Japanese Patent Application Laid-Open No. H02-001501). In the technology described in Japanese Patent Application Laid-Open No. H02-001501, a single interferometer serves as both the measurement interferometer and the correction interferometer. The interferometer is set on the moving member and moved together with the moving member between a pair of mirrors. A laser beam from a laser oscillator is divided into two by a beam splitter of the interferometer to generate a measurement laser beam (laser beam for measurement) for the measurement interferometer and a correction laser beam (laser beam for correction) for the correction interferometer, to thereby form respective optical paths without overlapping with each other. In order to equally influence both the laser beams by the change in refractive index of air, the optical paths of both the laser beams are formed close to each other.

In the measurement interferometer, the measurement laser beam is emitted to only one of the pair of mirrors. In contrast to this, in the correction interferometer, the correction laser beam is emitted to both the mirrors. Therefore, the optical paths of the respective laser beams which are formed between the one of the mirror and the interferometer are close to each other, but an optical path through which the measurement laser beam does not pass and only the correction laser beam passes is formed between the other mirror and the interferometer. A distance between the mirrors is constant irrespective of the movement of the moving member. Thus, the change in refractive index of air may be obtained based on a change in optical path length which is measured by the correction interferometer, and the obtained result may be reflected in a result obtained by measurement by the measurement interferometer.

However, in recent years, the further improvement of positioning precision of the moving member has been desired. In the conventional structure described above, a measurement error is large. To be specific, the optical path of the measurement laser beam and the optical path of the correction laser beam are close to, but separated from, each other. Therefore, a result obtained by correcting the displacement of the moving member has an error because of a spatial difference of the change in refractive index of air. That is, there is a spatial refractive index distribution in air and the changes of the refractive index of air on the respective optical paths are different from each other. Thus, when the result obtained by measurement by the measurement interferometer is corrected based on the result obtained by measurement by the correction interferometer reflecting a different refractive index change, a measurement result of the displacement of the moving member may have an error.

The correction laser beam passes through not only an optical path close to the optical path of the measurement laser beam but also an optical path different from the optical path close to the optical path of the measurement laser beam, and hence the measurement result of the displacement of the moving member may have an increased error.

SUMMARY OF THE INVENTION

Therefore, an object of the present invention is to provide a laser gauge interferometer in which a correction error caused by the influence of a refractive index distribution of air may be reduced to improve measurement precision.

The present invention provides a laser gauge interferometer for measuring a displacement amount of a moving member relative to a base member based on laser beam interference, including; multiple reflection units for reflecting laser beams, a measurement laser light source for emitting a measurement laser beam, a measurement interferometer for dividing the measurement laser beam into two in opposite directions (directions for diverging from each other) and causing a first measurement laser beam component and a second measurement laser beam component to interfere with each other, to generate a measurement interference beam, the first measurement laser beam component being reflected on at least one of the multiple reflection units to pass through a first optical path that is at least partially provided in air, the second measurement laser beam component being reflected on at least one of the multiple reflection units to pass through a second optical path that is at least partially provided in air;, a correction laser light source for emitting a correction laser beam; a correction interferometer for dividing the correction laser beam into two and causing a first correction laser beam component and a second correction laser light beam component to interfere with each other, to generate a correction interference beam, the first correction laser beam component passing through the first optical path and the second optical path, the second correction laser beam component being reflected on at least one of the multiple reflection units; and an arithmetic processing device for obtaining a measurement value corresponding to a change in optical distance of the moving member based on the measurement interference beam, obtaining a correction value corresponding to a change in refractive index of air through which the first correction laser beam component passes based on the correction interference beam, and correcting the measurement value based on the correction value to compute the displacement amount of the moving member, when one of the measurement interferometer and at least a part of the multiple reflection units is provided on the moving member to change a length of the first optical path and a length of the second optical path.

According to the present invention, an optical path of the measurement laser beam and an optical path of the correction laser beam are agreed with each other. Therefore, when the displacement amount of the moving member is computed by the arithmetic processing unit, an error due to a difference between changes in refractive index of air is reduced. Thus, the measurement precision of the displacement amount of the moving member is improved.

Further features of the present invention will become apparent from the following description of exemplary embodiments with reference to the attached drawings.

DESCRIPTION OF THE EMBODIMENTS

Hereinafter, embodiments of the present invention are described in detail with reference to the attached drawings.

(First Embodiment)

Figure 1:
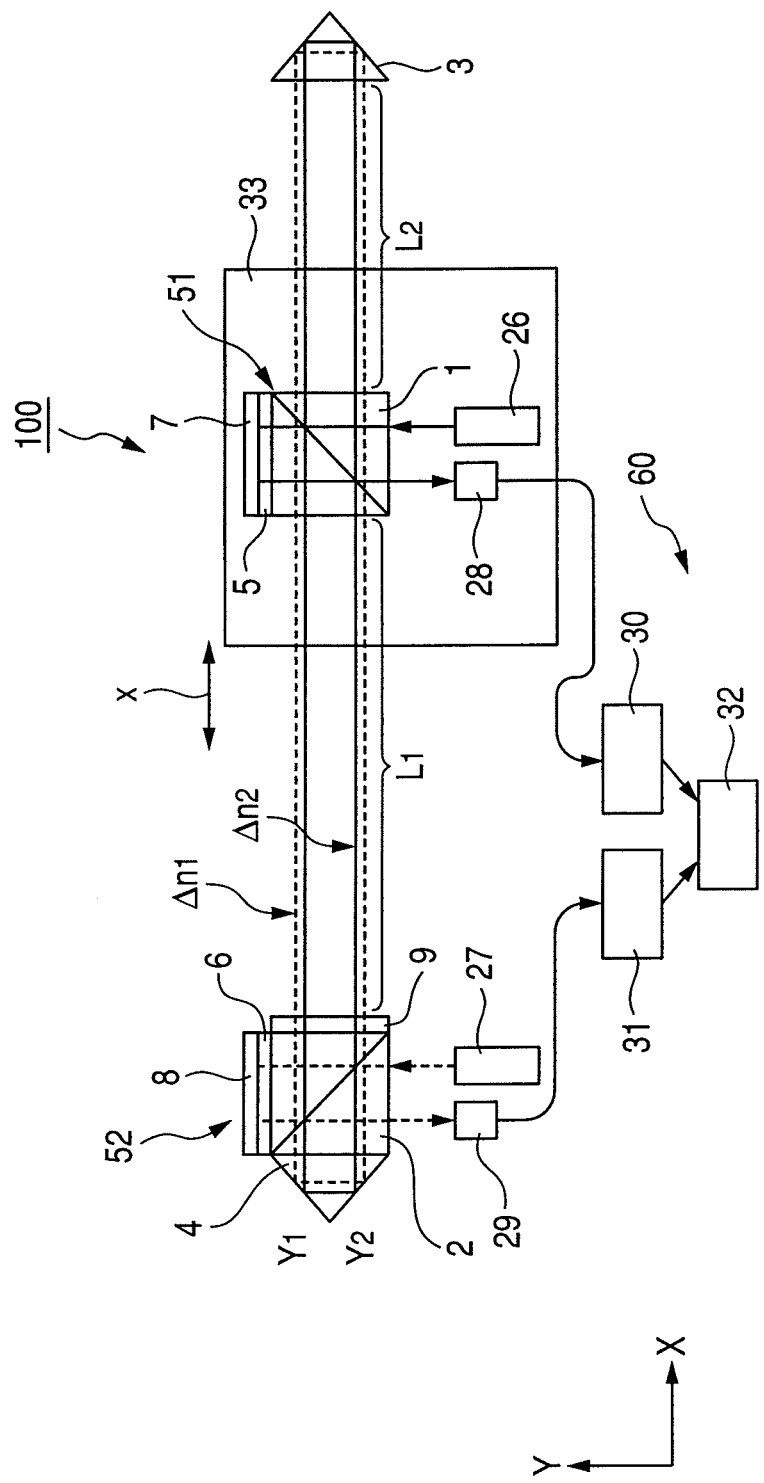
FIG. 1 illustrates a structure of a laser gauge interferometer according to a first embodiment of the present invention.

As illustrated in FIG. 1, a laser gauge interferometer 100 includes a pair of corner cubes 3 and 4 serving as a pair of reflection units for reflecting laser beams. The pair of corner cubes 3 and 4 are fixed to a base member (not shown) and maintained at a predetermined distance. In FIG. 1, a moving member 33 is, for example, a movable stage (X-stage) and linearly moved between the pair of corner cubes 3 and 4 in a direction indicated by an arrow "x". The laser gauge interferometer 100 measures an amount of displacement of the moving member 33 which is moved, based on interference of laser beams. Note that, although a case where the reflection units are the corner cubes 3 and 4 is described, the reflection units may be rectangular mirrors.

The laser gauge interferometer 100 further includes a measurement laser oscillator (laser oscillator for measurement) 26 serving as a measurement laser light source, a correction laser oscillator (laser oscillator for correction) 27 serving as a correction laser light source, a measurement interferometer 51, a correction interferometer 52, and an arithmetic processing device 60 serving as an arithmetic processing unit. The arithmetic processing device 60 includes condensers 28 and 29, optical path difference measurement devices 30 and 31, and an arithmetic device 32. In FIG. 1, a measurement laser beam is indicated by a solid line and a correction laser beam is indicated by a broken line. An optical path of the measurement laser beam is set so that at least a part of the measurement laser beam passes through air. In this specification, air is a general gas including air. One of optical paths of the correction laser beam is set adjacent to the optical path of the measurement laser beam. Further, the correction laser beam and the measurement laser beam desirably travel on the same optical path (on optical paths overlapping with each other). In FIG. 1, the optical paths are slightly shifted from each other for the sake of convenience, but desirably actually overlapped with each other. The measurement laser oscillator 26, the measurement interferometer 51, and the condenser 28 are provided on the moving member 33 and fixed thereto. The correction laser oscillator 27, the correction interferometer 52, and the condenser 29 are fixed to a base member (not shown) not to move relative to the pair of corner cubes 3 and 4.

Figure 7:
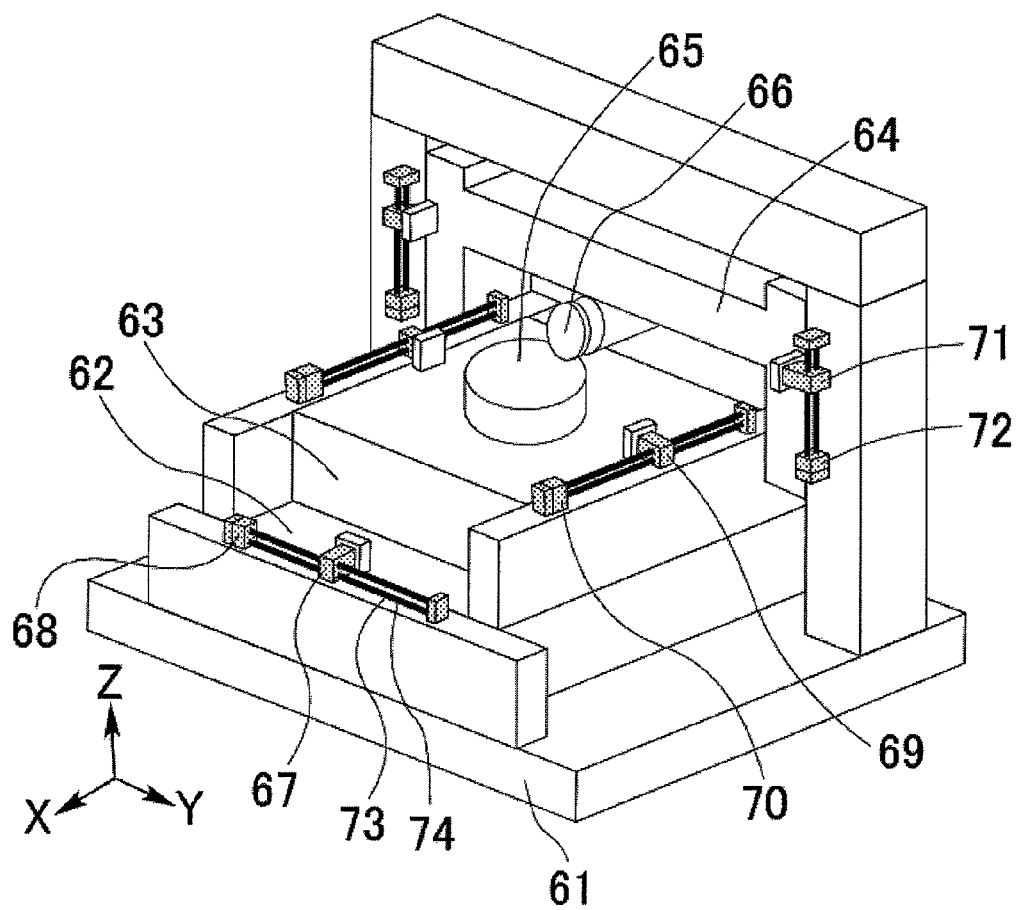
FIG. 7 illustrates a structure of a machining apparatus according to a seventh embodiment of the present invention.
Figure 8:
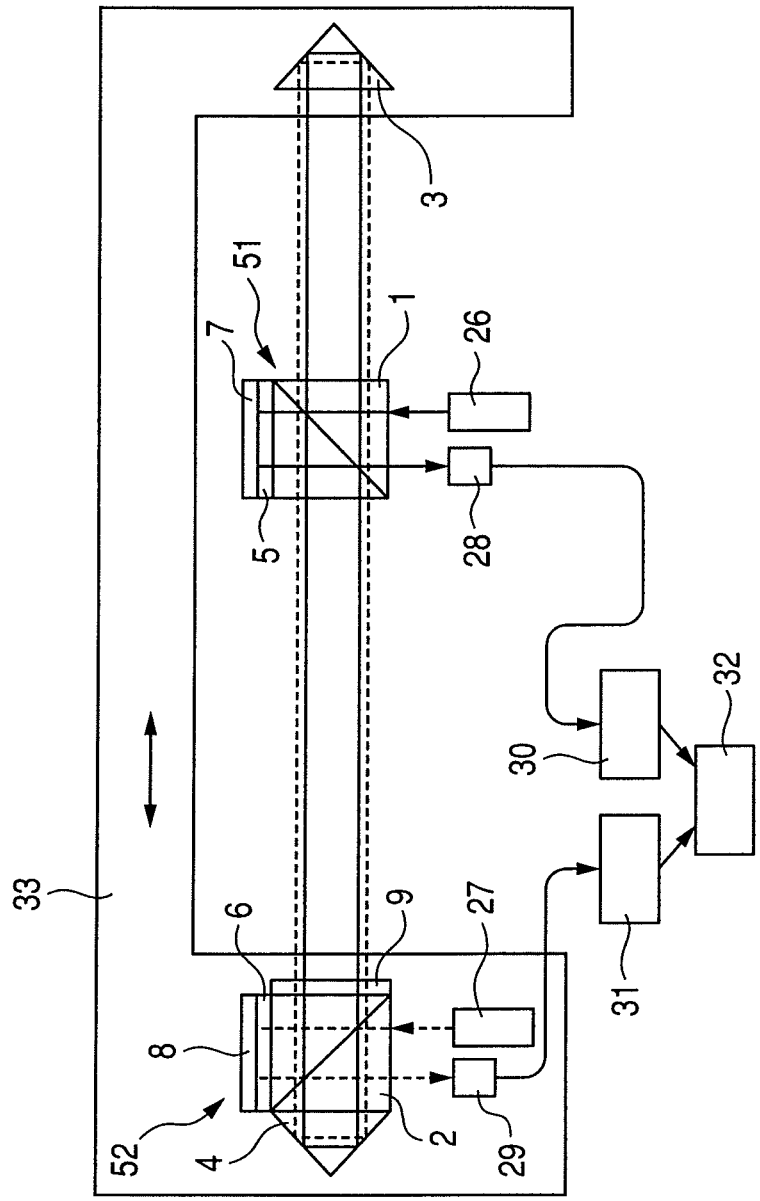
FIG. 8 illustrates a modified example of the laser gauge interferometer according to the first embodiment of the present invention.

In this embodiment, the corner cubes 3 and 4, the correction laser oscillator 27, the correction interferometer 52, and the condenser 29 are fixed to the base member, and the measurement laser oscillator 26, the measurement interferometer 51, and the condenser 28 are provided on the moving member 33. In addition to the structure, as illustrated in FIG. 7, the corner cubes 3 and 4, the correction laser oscillator 27, the correction interferometer 52, and the condenser 29 may be provided on the moving member 33 to be movable, and the measurement laser oscillator 26, the measurement interferometer 51, and the condenser 28 may be fixed to the base member or the like.

The measurement laser oscillator 26 emits a measurement laser beam including two linearly polarized light components (S-polarized light and P-polarized light) orthogonal to each other in a direction orthogonal to a moving direction (direction indicated by arrow "x") of the moving member 33. The measurement interferometer 51 is opposed to the measurement laser oscillator 26 and provided to move between the pair of corner cubes 3 and 4. The measurement laser oscillator 26 and condenser 28, and the measurement interferometer 51 are arranged in the direction orthogonal to the moving direction of the moving member 33. The measurement interferometer 51 includes a polarization beam splitter 1, a ¼-wavelength plate 5, and a plane mirror 7. The polarization beam splitter 1, the ¼-wavelength plate 5, and the plane mirror 7 are arranged in order adjacent to each other along a traveling direction of the measurement laser beam emitted from the measurement laser oscillator 26. The polarization beam splitter 1 transmits the P-polarized light of the two linearly polarized light components orthogonal to each other and reflects the S-polarized light thereof at a right angle. The polarization beam splitter 1 is provided between the pair of corner cubes 3 and 4.

The correction laser oscillator 27 is provided close to the corner cube 4 and emits a correction laser beam including two linearly polarized light components (S-polarized light and P-polarized light) orthogonal to each other in the direction orthogonal to the moving direction of the moving member 33. The correction interferometer 52 is opposed to the correction laser oscillator 27, provided between the pair of corner cubes 3 and 4, and adjacent to a reflection surface of one of the corner cubes (corner cube 4 in this embodiment). The correction laser oscillator 27 and condenser 29, and the correction interferometer 52 are arranged in the direction orthogonal to the moving direction of the moving member 33. The correction interferometer 52 includes a polarization beam splitter 2, a ½-wavelength plate 9, a ¼-wavelength plate 6, and a plane mirror 8. The polarization beam splitter 2, the ¼-wavelength plate 6, and the plane mirror 8 are arranged in order along the traveling direction of the correction laser beam emitted from the correction laser oscillator 27. The polarization beam splitter 2 is provided between the pair of corner cubes 3 and 4 and adjacent to the reflection surface of one of the corner cubes (corner cube 4 in this embodiment). The ½-wavelength plate 9 is opposed to the corner cube 4 with respect to the polarization beam splitter 2 and provided adjacent to the polarization beam splitter 2.

In the first embodiment, the measurement interferometer 51 divides the measurement laser beam which is incident from the measurement laser oscillator 26 into a first measurement laser beam component (first laser beam component for measurement) and a second measurement laser beam component which travel in opposite directions, to thereby irradiate the pair of corner cubes 3 and 4 with the respective measurement laser beam components. Then, the measurement interferometer 51 generates the first measurement laser beam component and the second measurement laser beam component which are reflected by the respective corner cubes 3 and 4 and returned therefrom, to interfere with each other, to thereby generate a measurement interference light beam. When the moving member 33 moves or when a refractive index of air changes, an optical path length of at least one of the first measurement laser beam component and the second measurement laser beam component changes.

In contrast to this, the correction interferometer 52 divides the correction laser beam which is incident from the correction laser oscillator 27 into a first correction laser beam component (first laser beam component for correction) and a second correction laser beam component (second laser beam component for correction). Of the respective correction laser beam components, the first correction laser beam component goes and returns between the pair of corner cubes 3 and 4. The second correction laser beam component is used as a reference light beam which does not pass through air. The first correction laser beam component and the second correction laser beam component are caused to interfere with each other, to thereby generate a correction interference light beam. When the refractive index of air changes, an optical path length of the first correction laser beam component changes, but an optical path length of the second correction laser beam component does not change because the second correction laser beam component does not pass through air.

The condenser 28 of the arithmetic processing device 60 outputs, to the optical path difference measurement device 30, a measurement interference signal obtained by performing photoelectric conversion on the incident measurement interference light beam. The optical path difference measurement device 30 outputs, to the arithmetic device 32, an optical path difference signal corresponding to a change in difference between the optical path length of the first measurement laser beam component and the optical path length of the second measurement laser beam component from a reset point in time, based on the input measurement interference signal. The reset point is a reference point. The position of the moving member 33 at the reset point is a reference position. Therefore, the measurement interferometer 51 is used to obtain how much the moving member 33 is displaced from the reference position (displacement amount). The condenser 29 of the arithmetic processing device 60 outputs, to the optical path difference measurement device 31, a correction interference signal obtained by performing photoelectric conversion on the incident correction interference light beam. The optical path difference measurement device 31 outputs, to the arithmetic device 32, a correction signal corresponding to a change in difference between the optical path length of the first correction laser beam component and the optical path length of the second correction laser beam component (reference light beam) from the reset point, based on the input correction interference signal. The reference light beam does not pass through air, and hence an optical path length in air is zero.

The arithmetic device 32 obtains a measurement value corresponding to a change in optical distance from the reference position of the moving member 33, based on the input optical path difference signal. Further, the arithmetic device 32 obtains a correction value corresponding to a change in refractive index of air through which the first correction laser beam component passes, from the reset point, based on the input correction signal. The arithmetic device 32 corrects the measurement value based on the correction value to compute the amount of displacement of the moving member 33 from the reference position. In other words, the arithmetic device 32 computes the amount of displacement of the moving member 33 in which the influence of the change in refractive index of air is corrected, based on the measurement outputs from the optical path difference measurement devices 30 and 31.

Hereinafter, operations of the respective portions are specifically described. In this embodiment, a case where regions (both outward and return paths) indicated by L1 and L2 in FIG. 1 are in air is described. In the measurement interferometer 51, the first measurement laser beam component (S-polarized light) of the measurement laser beam entering the polarization beam splitter 1 is reflected to the corner cube 3 side in a direction orthogonal to an incident direction (direction parallel to moving direction of moving member 33). The second measurement laser beam component (P-polarized light) entering the polarization beam splitter 1 travels in the incident direction. Therefore, the measurement laser beam is divided into the two beam components. A unit for dividing the measurement laser beam into the two beam components is referred to as a measurement laser beam dividing unit, and in this embodiment, the measurement laser beam dividing unit is the polarization beam splitter 1. The second measurement laser beam component passing through the polarization beam splitter 1 is turned back by the plane mirror 7, and hence the second measurement laser beam component passes through the ¼-wavelength plate 5 twice to become S-polarized light. Then, the second measurement laser beam component enters the polarization beam splitter 1 again and is reflected in a direction reverse to the traveling direction of the first measurement laser beam component (reflected to corner cube 4 side). Thus, the first measurement laser beam component and the second measurement laser beam component are reflected in the opposite directions by the polarization beam splitter 1. The respective measurement laser beam components reflected in the opposite directions by the polarization beam splitter 1 travel, in the directions parallel to the moving direction of the moving member 33. Thus, the pair of corner cubes 3 and 4 provided on extensions of the parallel directions are irradiated with the respective measurement laser beam components.

Then, the first measurement laser beam component passes through an optical path in air and is reflected by the corner cube 3. The first measurement laser beam component reflected by the corner cube 3 passes through the optical path in air and returns to the polarization beam splitter 1. The first measurement laser beam component returning to the polarization beam splitter 1 is the S-polarized light, and hence the first measurement laser beam component is reflected by the polarization beam splitter 1 at the right angle to the incident surface side on which the measurement laser beam enters from the measurement laser oscillator 26. The second measurement laser beam component passes through an optical path in air and then passes through the ½-wavelength plate 9 to become the P-polarized light. After that, the second measurement laser beam component passes through the polarization beam splitter 2 and is reflected by the corner cube 4. The second measurement laser beam component reflected by the corner cube 4 passes through the polarization beam splitter 2 again and then passes through the ½-wavelength plate 9 to become the S-polarized light. Then, the second measurement laser beam component passes through the optical path in air and returns to the polarization beam splitter 1. Therefore, the second measurement laser beam component returning to the polarization beam splitter 1 is the S-polarized light, and hence the second measurement laser beam component is reflected by the polarization beam splitter 1 to the ¼-wavelength plate 5 side at the right angle and turned back by the plane mirror 7. Thus, the second measurement laser beam component passes through the ¼-wavelength plate 5 twice to become the P-polarized light. The second measurement laser beam component which is the P-polarized light passes through the polarization beam splitter 1 (travels in straight line).

The first measurement laser beam component is reflected by the polarization beam splitter 1 and passes through a first optical path to return to the polarization beam splitter 1. The second measurement laser beam component is reflected by the polarization beam splitter 1 and passes through a second optical path to return to the polarization beam splitter 1. When the first measurement laser beam component and the second measurement laser beam component merge with each other at the polarization beam splitter 1, interference occurs to produce the measurement interference light beam. Therefore, the measurement interferometer 51 serves as a differential double path interferometer for measuring the displacement of the moving member 33 between the corner cubes 3 and 4. Note that, the first optical path is an optical path in which the first measurement laser beam component reflected by the polarization beam splitter 1 is reflected by the corner cube 3 and returns to the polarization beam splitter 1. A reflection unit (in this embodiment, the polarization beam splitter 1 and the corner cube 3) provided to cause the first measurement laser beam component to pass through the first optical path is referred to as a first reflection unit. In addition, the second optical path is an optical path in which the second measurement laser beam component reflected by the polarization beam splitter 1 is reflected by the corner cube 4 and returns to the polarization beam splitter 1. A reflection unit (in this embodiment, the polarization beam splitter 1 and the corner cube 4) provided to cause the second measurement laser beam component to pass through the second optical path is referred to as a second reflection unit.

In contrast to this, in the correction interferometer 52, the first correction laser beam component (P-polarized light) of the correction laser beam entering the polarization beam splitter 2 travels in an incident direction. The second correction laser beam component (S-polarized light) is reflected to the corner cube 4 side in the direction orthogonal to the incident direction (direction parallel to moving direction of moving member 33). Therefore, the correction laser beam is divided into the two beam components. A unit for dividing the correction laser beam into the two beam components is referred to as a correction laser beam dividing unit, and in this embodiment, the correction laser beam dividing unit is the polarization beam splitter 2. The first correction laser beam component passing through the polarization beam splitter 2 is turned back by the plane mirror 8, and hence the first correction laser beam component passes through the ¼-wavelength plate 6 twice to become S-polarized light. Then, the first correction laser beam component enters the polarization beam splitter 2 again and is reflected in a direction reverse to the traveling direction of the second correction laser beam component (reflected to corner cube 3 side). Thus, the first correction laser beam component and the second correction laser beam component are reflected in the opposite directions by the polarization beam splitter 2. The respective correction laser beam components reflected in the opposite directions by the polarization beam splitter 2 travel in the directions parallel to the moving direction of the moving member 33. Thus, the pair of corner cubes 3 and 4 provided on extensions of the parallel directions are irradiated with the respective correction laser beam components.

The second correction laser beam component is reflected by the polarization beam splitter 2 and passes through a fourth optical path to return to the polarization beam splitter 2. The second correction laser beam component reflected by the polarization beam splitter 2 and then by the corner cube 4 to return to the polarization beam splitter 2 is the S-polarized light, and thus is reflected by the polarization beam splitter 2 at the right angle to the incident surface side on which the correction laser beam enters from the correction laser oscillator 27. In other words, the second correction laser beam component is the reference light beam, and thus is reflected by the corner cube 4 without passing through air, to return to the polarization beam splitter 2. Therefore, the optical path length does not vary. The first correction laser beam component reflected by the polarization beam splitter 2 passes through a third optical path to return to the polarization beam splitter 2. In other words, the first correction laser beam component passes through the ½-wavelength plate 9 to become the P-polarized light, passes through the optical path in air, the polarization beam splitter 1, and the optical path in air, and then is reflected by the corner cube 3. The first correction laser beam component reflected by the corner cube 3 passes through the optical path in air, the polarization beam splitter 1, and the optical path in air again, and then passes through the ½-wavelength plate 9 to become the S-polarized light, to thereby return to the polarization beam splitter 2. The first correction laser beam component which has been returned to the polarization beam splitter 2 in this manner is the S-polarized light, and hence the first correction laser beam component is reflected by the polarization beam splitter 2 to the ¼-wavelength plate 6 side at the right angle and turned back by the plane mirror 8. Thus, the first correction laser beam component passes through the ¼-wavelength plate 6 twice to become the P-polarized light. The first correction laser beam component which is the P-polarized light passes through the polarization beam splitter 2 (travels in straight line). When the first correction laser beam component and the second correction laser beam component (reference light beam) which are reflected by the respective corner cubes 3 and 4 to return to the polarization beam splitter 2 merge with each other in the polarization beam splitter 2, interference occurs to produce the correction interference light beam. Note that, the third optical path is an optical path in which the first correction laser beam component reflected by the polarization beam splitter 2 is reflected by the corner cube 3 and returns to the polarization beam splitter 2. A reflection unit (in this embodiment, the polarization beam splitter 2 and the corner cube 3) provided to cause the first correction laser beam component to pass through the third optical path is referred to as a third reflection unit. In addition, the fourth optical path is an optical path in which the second correction laser beam component reflected by the polarization beam splitter 2 is reflected by the corner cube 4 and returns to the polarization beam splitter 2. A reflection unit (in this embodiment, the polarization beam splitter 2 and the corner cube 4) provided to cause the second correction laser beam component to pass through the fourth optical path is referred to as a fourth reflection unit.

In other words, the corner cubes 3 and 4 and the correction interferometer 52 are fixed to the base member (not shown), and hence, even when the moving member 33 (polarization beam splitter 1) moves, an actual distance traveled by the first correction laser beam component through air between the corner cubes 3 and 4 is constant. Therefore, an optical path length (optical distance) in which the first correction laser beam component travels back and forth through air between the pair of corner cubes 3 and 4 is varied by only the change in refractive index of air. Thus, the correction interferometer 52 serves as a single path interferometer for detecting the change in refractive index of air between the corner cubes 3 and 4.

Here, the respective measurement laser beam components obtained by division into two by the polarization beam splitter 1 are reflected by the corner cubes 3 and 4 to return to the polarization beam splitter 1, but the optical paths in air (outward and return paths) are slightly shifted from each other. That is, the first measurement laser beam component is deflected 180° by the corner cube 3 and thus the incident light beam (outward path) and the reflected light beam (return path) are parallel in direction to each other, but the optical paths (outward and return paths) are slightly shifted from each other. Similarly, the second measurement laser beam component is deflected 180° by the corner cube 4 and thus the incident light beam (outward path) and the reflected light beam (return path) are parallel in direction to each other, but the optical paths (outward and return paths) are slightly shifted from each other. The outward paths of the optical paths in air of the respective measurement laser beam components are formed in a straight line to interpose the polarization beam splitter 1 of the measurement interferometer 51. The return paths of the optical paths in air of the respective measurement laser beam components are formed in a straight line to interpose the polarization beam splitter 1.

In the first embodiment, the first correction laser beam component is caused to pass through the polarization beam splitter 1 of the measurement interferometer 51, and hence the outward path of the optical path in air of the first correction laser beam component is agreed with the return paths of the optical paths in air of the two measurement laser beam components. In addition, the first correction laser beam component is caused to pass through the polarization beam splitter 1 of the measurement interferometer 51, and hence the return path of the optical path in air of the first correction laser beam component reflected by the corner cube 3 is agreed with the outward paths of the optical paths in air of the two measurement laser beam components. Therefore, the first correction laser beam component passes through the first optical path and the second optical path. In other words, the first correction laser beam component passes through the same optical paths as the optical paths in air of the respective measurement laser beam components.

In the first embodiment, the optical paths in air of the measurement interferometer 51 and the correction interferometer 52 are agreed with each other between the corner cubes 3 and 4. Therefore, the influences of a refractive index distribution which cause a correction error of refractive index of air may be averaged to improve measurement precision.

Hereinafter, a mechanism for averaging the influences of the refractive index distribution is described. In FIG. 1, a two-dimensional orthogonal coordinate system X-Y is defined in which a length measurement direction of the measurement interferometer 51 is set as an X-axis. In the first embodiment, Y-axis positions on an optical path common to the measurement interferometer 51 and the correction interferometer 52 are denoted by $Y_1$ and $Y_2$ in FIG. 1. Distances in regions which are in air between the measurement interferometer 51 and the corner cubes 3 and 4 are denoted by L1 and L2. A case is described where $\Delta n_1$ indicates a change in refractive index of air in the Y-axis position $Y_1$ on the optical path of the measurement interferometer 51 and the correction interferometer 52 from the reset point and $\Delta n_2$ indicates a change in refractive index of air in the Y-axis position $Y_2$ on the optical path thereof from the reset point. Assume that the moving member 33 does not move from the reference position.

In the first embodiment, the measurement interferometer 51 is the differential double path interferometer. Therefore, when a distance in a case where optical paths are in vacuum is denoted by $L_i$ (i=1, 2), changes in optical path lengths of the respective measurement laser beam components in the measurement interferometer 51, which are caused by the changes in refractive index of air, are expressed by the following Expression 1.

$$\Delta n_1 L_i + \Delta n_2 L_i = \frac{\Delta n_1 + \Delta n_2}{2} \times 2L_i \quad \text{(Expression 1)}$$

Therefore, the optical path difference measurement device 30 outputs, to the arithmetic device 32, the optical path difference signal corresponding to the difference between the changes in optical path lengths of the respective measurement laser beam components in air as expressed by Expression 1. In other words, the optical path difference signal exhibits the amount of change of the optical path length difference between the two measurement laser beam components, from the reset point. The arithmetic device 32 obtains the measurement value corresponding to the change in optical path length difference between the two measurement laser beam components (change in optical distance of moving member 33) from the reset point, based on the input optical path difference signal. The optical path length (actual distance) of the respective measurement laser beam components in the measurement interferometer 51 in the case where the optical paths are in vacuum is expressed by "$2 \times L_i$". Therefore, as is apparent from Expression 1, the change in refractive index which is reflected as an error in the measurement interferometer 51 is an average value (($\Delta n_1 + \Delta n_2$)/2) of the changes in refractive index ($\Delta n_1$ and $\Delta n_2$) in the Y-axis positions $Y_1$ and $Y_2$.

Next, the change in optical path length of the first correction laser beam component in the correction interferometer 52 is expressed by the following Expression 2.

$$\Delta n_1(L_1 + L_2) + \Delta n_2(L_1 + L_2) = \frac{\Delta n_1 + \Delta n_2}{2} \times 2(L_1 + L_2) \quad \text{(Expression 2)}$$

The second correction laser beam component (reference light beam) does not pass through air, and hence the change in optical path length in air is zero. Therefore, the difference between the changes in the optical path lengths of the respective correction laser beam components is expressed by Expression 2. The optical path difference measurement device 31 outputs, to the arithmetic device 32, the correction signal corresponding to the difference between the changes in optical path lengths of the respective correction laser beam components in air as expressed by Expression 2. In other words, the correction signal exhibits the amount of change of the optical path length difference between the two correction laser beam components (that is, optical path length of the first correction laser beam component) from the reset point. The optical path length (actual distance) of the first correction laser beam component in the correction interferometer 52 in the case where the optical paths are in vacuum is expressed by "$2 \times (L_1 + L_2)$", and thus is a constant value. In other words, ($L_1 + L_2$) is a constant value, and hence the change in optical path length is caused by the change in refractive index of air. Therefore, as is apparent from Expression 2, the change in refractive index which is reflected in the correction interferometer is the average value (($\Delta n_1 + \Delta n_2$)/2) of the changes in refractive index ($\Delta n_1$ and $\Delta n_2$) in the Y-axis positions $Y_1$ and $Y_2$. Note that, the value of ($L_1 + L_2$) is set in advance in the arithmetic device 32.

Thus, the correction value of the change in refractive index which is calculated based on the measurement output of the correction interferometer 52 is the average value (($\Delta n_1 + \Delta n_2$)/2). In other words, the average value (($\Delta n_1 + \Delta n_2$)/2) is the correction value corresponding to the change in refractive index of air through which the first correction laser beam component passes, which is obtained by the arithmetic device 32.

In the arithmetic device 32, the measurement value obtained based on the input optical path difference signal from the optical path difference measurement device 30 is corrected (divided) by the correction value obtained based on the input correction signal from the optical path difference measurement device 31, to compute the amount of displacement of the moving member 33. Therefore, even in the case where there is the spatial refractive index distribution of air, when the influences of the refractive index distribution are averaged, a refractive index correction error is reduced to improve measurement precision.

According to the first embodiment described above, the optical paths of the respective measurement laser beam components are agreed with the optical path of the first correction laser beam component. Therefore, an error due to the difference between the changes in refractive index of air is reduced in the case where the amount of displacement of the moving member 33 is computed by the arithmetic processing device 60. Thus, the measurement precision of the amount of displacement of the moving member 33 is improved, and hence the positioning precision of the moving member 33 is improved.

In the first embodiment, the case where the regions (both outward and return paths) indicated by L1 and L2 in FIG. 1 are in air is described. However, the present invention is not limited to this case. Therefore, when a structure is employed in which at least a part of one of the first optical path and the second optical path extends through air, the effect of the present invention may be obtained.

(Second Embodiment)

Figure 2:
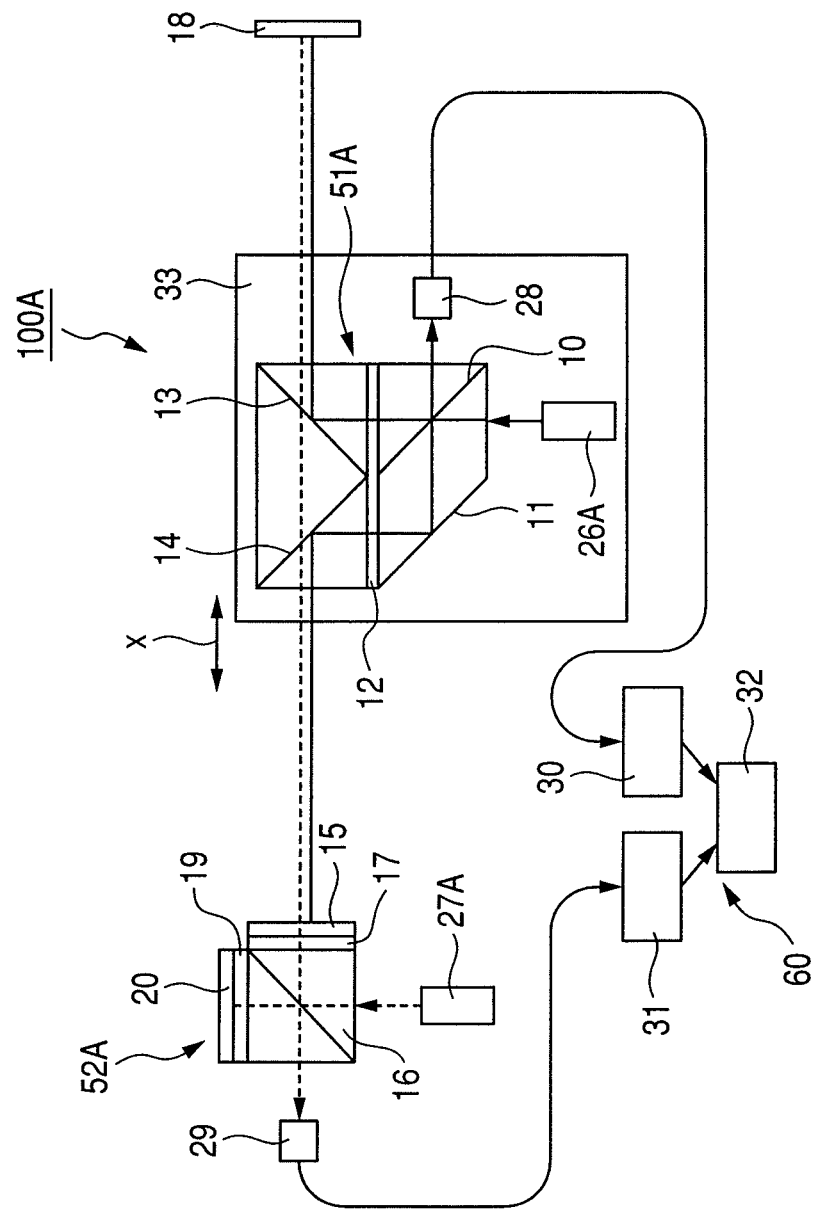
FIG. 2 illustrates a structure of a laser gauge interferometer according to a second embodiment of the present invention.

Next, referring to FIG. 2, a laser gauge interferometer 100A according to a second embodiment is described. In the second embodiment, the same structures as in the first embodiment are denoted by the same reference symbols and the description thereof is omitted. The laser gauge interferometer 100A includes a plane mirror serving as one of a pair of reflection units and a dichroic mirror 15 serving as the other of the pair of reflection units. The pair of mirrors 15 and 18 are fixed to a base member (not shown) and maintained at a predetermined distance. The moving member 33 is linearly moved between the pair of mirrors 15 and 18 in the direction indicated by the arrow "x". The laser gauge interferometer 100A measures the amount of displacement of the moving member 33 during moving, based on the interference of laser beams. The laser gauge interferometer 100A further includes a measurement laser oscillator 26A, a measurement interferometer 51A, a correction laser oscillator 27A, and a correction interferometer 52A. In FIG. 2, a measurement laser beam is indicated by a solid line and a correction laser beam is indicated by a broken line. In FIG. 2, the optical paths of the measurement laser beam and the correction laser beam in air are actually overlapped with each other, but slightly shifted from each other for the sake of convenience. The measurement laser oscillator 26A, the measurement interferometer 51A, and the condenser 28 are provided on the moving member 33 and fixed thereto. The correction laser oscillator 27A, the correction interferometer 52A, and the condenser 29 are fixed to a base member (not shown) not to move relative to the pair of mirrors 15 and 18.

In this embodiment, the pair of mirrors 15 and 18 are fixed to the base member and the measurement laser oscillator 26A, the measurement interferometer 51A, and the condenser 28 are provided on the moving member 33. However, the present invention is not limited to such a structure. The pair of mirrors 15 and 18 may be provided on the moving member to be movable and the measurement laser oscillator 26A, the measurement interferometer 51A, and the condenser 28 may be fixed to the base member or the like.

The measurement laser oscillator 26A emits a measurement laser beam including two linearly polarized light components (S-polarized light and P-polarized light) orthogonal to each other in the direction orthogonal to the moving direction (direction indicated by arrow "x") of the moving member 33. The correction laser oscillator 27A is provided close to the dichroic mirror 15 and emits a correction laser beam including two linearly polarized light components orthogonal to each other in the direction orthogonal to the moving direction of the moving member 33. The correction laser beam is different in frequency from the measurement laser beam.

The measurement interferometer 51A is opposed to the measurement laser oscillator 26A and provided to move between the pair of mirrors 15 and 18. The measurement laser oscillator 26A and the measurement interferometer 51A are arranged in the direction orthogonal to the moving direction of the moving member 33. The measurement interferometer 51A includes a polarization beam splitter 10, a plane mirror 11 having an incident angle of 45°, a ¼-wavelength plate 12, and a pair of dichroic mirrors 13 and 14 each having an incident angle of 45°. The polarization beam splitter 10, the ¼-wavelength plate 12, and the dichroic mirror 13 are arranged in order adjacent to each other along the traveling direction of the measurement laser beam emitted from the measurement laser oscillator 26A. The plane mirror 11 is provided adjacent to the polarization beam splitter 10 on the dichroic mirror 15 side of the polarization beam splitter 10 in the moving direction of the moving member 33. The dichroic mirror 14 is provided adjacent to the dichroic mirror 13 on the dichroic mirror 15 side of the dichroic mirror 13 in the moving direction of the moving member 33. Therefore, the plane mirror 11 and the dichroic mirror 14 are provided to interpose the ¼-wavelength plate 12 therebetween in the direction orthogonal to the moving direction of the moving member 33. The pair of dichroic mirrors 13 and 14 are provided between the pair of mirrors 15 and 18. The dichroic mirrors 13, 14, and 15 reflect the measurement laser beam and transmit the correction laser beam different in frequency from the measurement laser beam. That is, the frequency of the measurement laser beam emitted from the measurement laser oscillator 26A is set to a frequency for reflection on the dichroic mirrors 13, 14, and 15. The frequency of the correction laser beam emitted from the correction laser oscillator 27A is set to a frequency for transmission of the dichroic mirrors 13, 14, and 15.

In contrast to this, the correction interferometer 52A is opposed to the correction laser oscillator 27A and provided adjacent to a surface of the dichroic mirror 15 which is opposed to a measurement laser beam reflection surface thereof. The correction laser oscillator 27A and the correction interferometer 52A are arranged in the direction orthogonal to the moving direction of the moving member 33. The correction interferometer 52A includes a polarization beam splitter 16, ¼-wavelength plates 17 and 19, and a plane mirror 20. The polarization beam splitter 16, the ¼-wavelength plate 19, and the plane mirror 20 are arranged in order along the traveling direction of the correction laser beam emitted from the correction laser oscillator 27A. The polarization beam splitter 16 is provided adjacent to the surface of the dichroic mirror 15 which is opposed to the measurement laser beam reflection surface thereof through the ¼-wavelength plate 17.

In the second embodiment, the measurement interferometer 51A divides the measurement laser beam which is incident from the measurement laser oscillator 26A into two measurement laser beam components which travel in opposite directions to irradiate the pair of mirrors 15 and 18 with the respective measurement laser beam components. Then, the measurement interferometer 51A generates the respective measurement laser beam components which are reflected on the mirrors 15 and 18 and returned therefrom, to interfere with each other, to thereby generate a measurement interference light beam. Further, the correction interferometer 52A divides the correction laser beam which is incident from the correction laser oscillator 27A into two correction laser beam components. Of the two correction laser beam components, a first correction laser beam component travels between the pair of mirrors 15 and 18. In addition, a second correction laser beam component is used as a reference light beam. The first correction laser beam component and the second correction laser beam component are caused to interfere with each other, to thereby generate a correction interference light beam.

Hereinafter, the operations of the respective portions are specifically described. In the measurement interferometer 51A, a first measurement laser beam component (P-polarized light) of the measurement laser beam entering the polarization beam splitter 10 travels in an incident direction of the measurement laser beam. A second measurement laser beam component (S-polarized light) is reflected to the plane mirror 11 side in a direction orthogonal to the incident direction. Therefore, the measurement laser beam is divided into the two beam components by the polarization beam splitter 10.

The first measurement laser beam component passing through the polarization beam splitter 10 passes through the ¼-wavelength plate 12 to become circularly polarized light, and then is reflected on the dichroic mirror 13 to the plane mirror 18 side at the right angle. The second measurement laser beam component reflected by the polarization beam splitter 10 is reflected on the plane mirror 11 to the dichroic mirror 14 side. After that, the second measurement laser beam component passes through the ¼-wavelength plate 12 to become circularly polarized light. Then, the second measurement laser beam component is reflected on the dichroic mirror 14 in a direction reverse to the traveling direction of the first measurement laser beam component (that is, reflected to dichroic mirror side). Therefore, the first measurement laser beam component and the second measurement laser beam component are reflected on the pair of dichroic mirrors 13 and 14 in the opposite directions. The respective measurement laser beam components thus reflected on the pair of dichroic mirrors 13 and 14 in the opposite directions travel, in the directions parallel to the moving direction of the moving member 33, to the pair of mirrors 15 and 18 provided on extensions of the parallel directions.

Then, the first measurement laser beam component passes through an optical path in air, perpendicularly enters the plane mirror 18, and is reflected thereon in the reverse direction. The first measurement laser beam component reflected on the plane mirror 18 passes through the same optical path in air again and returns to the dichroic mirror 13. The first measurement laser beam component returning to the dichroic mirror 13 is reflected on the dichroic mirror 13 to the polarization beam splitter side at the right angle, passes through the ¼-wavelength plate 12 to become the S-polarized light, and is reflected by the polarization beam splitter 10 at the right angle.

The second measurement laser beam component reflected on the dichroic mirror 14 passes through an optical path in air, and then perpendicularly enters the dichroic mirror 15 and is reflected thereon in the reverse direction. The second measurement laser beam component reflected on the dichroic mirror 15 passes through the same optical path in air again and returns to the dichroic mirror 14. The second measurement laser beam component returning to the dichroic mirror 14 is reflected on the dichroic mirror 14 to the plane mirror 11 side at the right angle and passes through the ¼-wavelength plate 12 to become the P-polarized light. After that, the second measurement laser beam component is reflected on the plane mirror 11 at the right angle and passes through the polarization beam splitter 10. In other words, the first measurement laser beam component is reflected on the dichroic mirror 13 and passes through a first optical path to return to the dichroic mirror 13. The second measurement laser beam component is reflected on the dichroic mirror 14 and passes through a second optical path to return to the dichroic mirror 14. When the first measurement laser beam component and the second measurement laser beam component merge with each other in the polarization beam splitter 10, interference occurs to produce the measurement interference light beam. Therefore, the measurement interferometer 51A serves as a differential double path interferometer for measuring the displacement of the moving member 33 between the mirrors 15 and 18. Note that, the first optical path is an optical path for the first measurement laser beam component. That is, the first optical path is an optical path in which the first measurement laser beam component reflected on the dichroic mirror 13 is reflected on the plane mirror 18 and returns to the dichroic mirror 13. The second optical path is an optical path for the second measurement laser beam component. That is, the second optical path is an optical path in which the second measurement laser beam component reflected on the dichroic mirror 14 is reflected on the dichroic mirror 15 and returns to the dichroic mirror 14.

In contrast to this, in the correction interferometer 52A, the first correction laser beam component (S-polarized light) of the correction laser beam entering the polarization beam splitter 16 is reflected to the side of the mirrors 15 and 18 in a direction orthogonal to an incident direction (that is, in direction parallel to moving direction of moving member 33). The second correction laser beam component (P-polarized light) passes through the polarization beam splitter 16 in the incident direction. Therefore, the correction laser beam is divided into the two beam components. The second correction laser beam component passing through the polarization beam splitter 16 is turned back by the plane mirror 20, and hence the second correction laser beam component passes through the ¼-wavelength plate 19 twice to become S-polarized light. Then, the second correction laser beam component enters the polarization beam splitter 16 again and is reflected in a direction reverse to the traveling direction of the first correction laser beam component (that is, reflected to condenser 29 side). Thus, the first correction laser beam component and the second correction laser beam component are reflected in the opposite directions by the polarization beam splitter 16.

The second correction laser beam component is the reference light beam, and thus is reflected by the polarization beam splitter 16 to the condenser 29 side without passing through air. Therefore, the optical path length does not vary. In contrast to this, the first correction laser beam component passes through the ¼-wavelength plate 17 to become the circularly polarized light, and passes through the dichroic mirror 15 and the optical path in air. After that, the first correction laser beam component passes through the pair of dichroic mirrors 14 and 13 in this order and further the optical path in air, and then perpendicularly enters the plane mirror 18 and is reflected thereon in the reverse direction.

The first correction laser beam component reflected on the plane mirror 18 passes through the same optical path in air, the pair of dichroic mirrors 13 and 14 in this order, the same optical path in air, and the dichroic mirror 15 again. The first correction laser beam component passing through the dichroic mirror 15 passes through the ¼-wavelength plate 17 to become the P-polarized light, to thereby return to the polarization beam splitter 16. The first correction laser beam component thus returning to the polarization beam splitter 16 is the P-polarized light, and hence the first correction laser beam component passes through the polarization beam splitter 16 (travels in straight line). When the first correction laser beam component, which has traveled between the mirrors 15 and 18 to return to the polarization beam splitter 16, and the second correction laser beam component, which is the reference light beam, merge with each other in the polarization beam splitter 16, interference occurs to produce the correction interference light beam.

In other words, the mirrors 15 and 18 and the correction interferometer 52A are fixed to the base member (not shown), and hence, even when the moving member 33 moves, an actual distance traveled by the first correction laser beam component through air between the mirrors 15 and is constant. Therefore, the optical path length (optical distance) of the first correction laser beam component traveling through air between the pair of mirrors 15 and 18 is varied by only the change in refractive index of air. Thus, the correction interferometer 52A serves as a single path interferometer for detecting the change in refractive index of air between the pair of mirrors 15 and 18.

The respective measurement laser beam components which are obtained by division into two by the polarization beam splitter 10 and reflected on the pair of dichroic mirrors 13 and 14 in the opposite directions are reflected on the mirrors 15 and 18 and passes through the same optical paths to return to the mirrors 13 and 14. Therefore, the optical paths in air of each of the measurement laser beam components which are the outward and return paths are agreed with each other. The optical paths in air of the respective measurement laser beam components are formed in a straight line to interpose the pair of dichroic mirrors 13 and 14 therebetween. The first correction laser beam component is reflected on the plane mirror 18 and turned back thereby, and hence the optical paths in air of the first correction laser beam component which are the outward and return paths are agreed with each other.

In the second embodiment, the first correction laser beam component is caused to pass through the pair of dichroic mirrors 13 and 14 of the measurement interferometer 51A, and hence the optical path in air of the first correction laser beam component is agreed with the optical paths in air of the two measurement laser beam components. Therefore, the first correction laser beam component passes through the first optical path and the second optical path. In other words, the first correction laser beam component passes through the same optical paths as the optical paths in air of the respective measurement laser beam components.

As described above, in the second embodiment, the outward and return paths of each of the laser beam components are agreed with each other, to thereby agree the optical paths of both the measurement laser beam components with the optical path of the first correction laser beam component. Therefore, when the amount of displacement of the moving member 33 is computed by the arithmetic processing device 60, the influence of the change in refractive index of air is reduced, and hence an error due to the difference between the changes in refractive index of air may be further reduced. Thus, the measurement precision of the amount of displacement of the moving member 33 is improved, and hence the positioning precision of the moving member 33 is improved.

(Third Embodiment)

Figure 3:
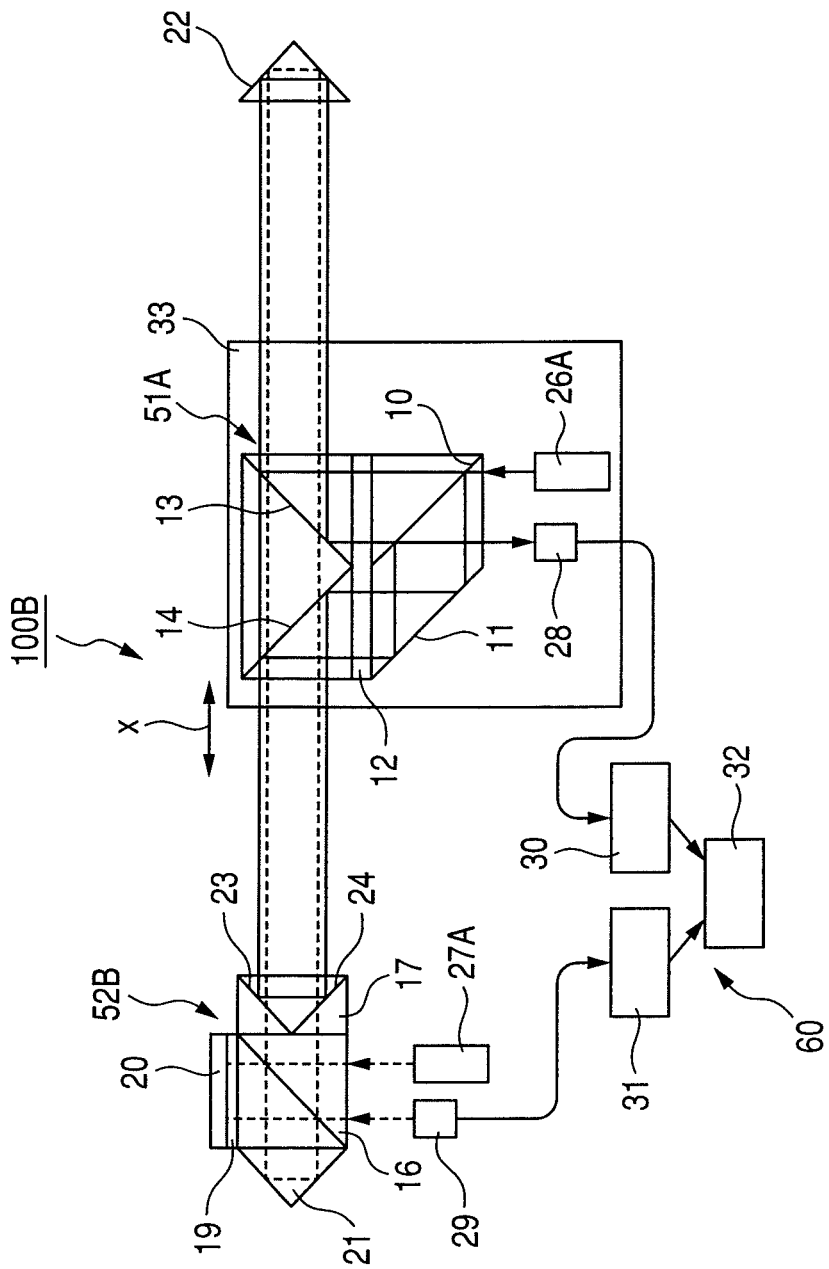
FIG. 3 illustrates a structure of a laser gauge interferometer according to a third embodiment of the present invention.

Next, referring to FIG. 3, a laser gauge interferometer 100B according to a third embodiment is described. In the third embodiment, the same structures as in the first and second embodiments are denoted by the same reference symbols and the description thereof is omitted. In FIG. 3, a measurement laser beam is indicated by a solid line and a correction laser beam is indicated by a broken line. In FIG. 3, the optical paths in air of the measurement laser beam and the correction laser beam are actually overlapped with each other, but slightly shifted from each other for the sake of convenience. The third embodiment is different from the second embodiment in terms of a pair of reflection units. That is, one of the reflection units is a corner cube 22 and the other of the reflection units is a pair of dichroic mirrors 23 and 24 each having an incident angle of 45°. Therefore, the correction interferometer 52B further includes a corner cube 21 provided adjacent to a surface of the polarization beam splitter 16 which is opposed to a ¼-wavelength plate 17 side surface thereof.

A dichroic mirror characteristic is changed depending on a beam incident angle, and hence it is necessary to manufacture a dichroic mirror having a specified beam incident angle. A 45°-incidence dichroic mirror is used for, for example, a liquid crystal projector and thus industrial demand is high, and hence the dichroic mirror is generally available. Therefore, there is an advantage that the pair of dichroic mirrors 23 and 24 each having the incident angle of 45° are used for the other reflection unit instead of the dichroic mirror having the incident angle of 90° as described in the second embodiment to suppress a manufacturing cost. The same function and effect as in the first embodiment are obtained.

In this embodiment, the pair of corner cubes 21 and 22 are fixed to a base member, and the measurement laser oscillator 26A, the measurement interferometer 51A, and the condenser 28 are provided on the moving member 33. However, the present invention is not limited to this. The pair of corner cubes 21 and 22 may be provided on a moving member to be movable and the measurement laser oscillator 26A, the measurement interferometer 51A, and the condenser 28 may be fixed to a base member.

(Fourth Embodiment)

Figure 4:
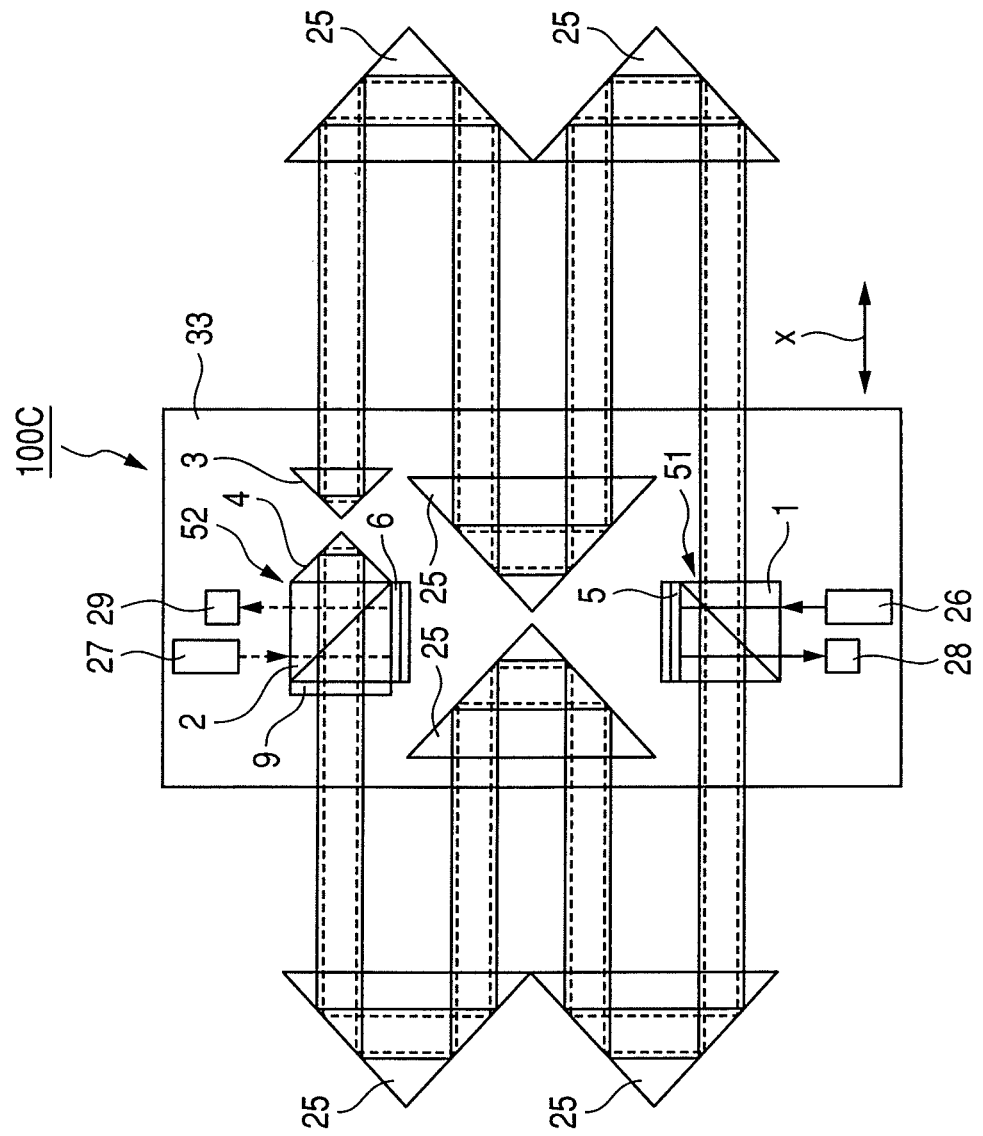
FIG. 4 illustrates a structure of a laser gauge interferometer according to a fourth embodiment of the present invention.

Next, referring to FIG. 4, a laser gauge interferometer 100C according to a fourth embodiment is described. In the fourth embodiment, the same structures as in the first embodiment are denoted by the same reference symbols and the description thereof is omitted. In the fourth embodiment, the laser gauge interferometer 100C includes multiple corner cubes 25 serving as intermediate reflection units in addition to the structure described in the first embodiment. In other words, the laser gauge interferometer 100C includes, as the multiple reflection units, the pair of corner cubes 3 and 4 and the multiple (six) corner cubes 25. Half (three) of the multiple (six) corner cubes 25 are provided on an optical path between the corner cube 3 and the measurement interferometer 51. Remaining half (three) of the corner cubes 25 are provided on an optical path between the corner cube 4 and the measurement interferometer 51. In other words, the number of corner cubes 25 provided on the optical path between the corner cube 3 and the measurement interferometer 51 and the number of corner cubes 25 provided on the optical path between the corner cube 4 and the measurement interferometer 51 are set to be equal to each other. The three corner cubes 25 provided on each of the optical paths are separately provided on the moving member 33 and a base member (not shown). The moving member is moved between the corner cubes 25 located on the optical path between the corner cube 3 and the measurement interferometer 51 and the corner cubes 25 provided on the optical path between the corner cube 4 and the measurement interferometer 51, which are provided on the base member (not shown). On each of a first optical path and a second optical path, a light beam travels back and forth between the base member and the moving member 33 multiple times. The first optical path is an optical path in which the first measurement laser beam component reflected on the polarization beam splitter 1 travels between the base member and the moving member 33 through the three corner cubes 25 multiple times, is reflected by the corner cube 3, and travels between the base member and the moving member 33 through the three corner cubes 25 multiple times again to return to the polarization beam splitter 1. The second optical path is an optical path in which the second measurement laser beam component reflected on the polarization beam splitter 1 travels between the base member and the moving member 33 through the other three corner cubes 25 multiple times, is reflected by the corner cube 4, and travels between the base member and the moving member 33 through the other three corner cubes 25 multiple times again to return to the polarization beam splitter 1. Therefore, a multi-path is set for the measurement interferometer 51 and the correction interferometer 52 to improve the measurement resolutions of both the measurement interferometer 51 and the correction interferometer 52. FIG. 4 illustrates an example in which the measurement interferometer is a differential eight-path interferometer and the correction interferometer is a four-path interferometer. The optical path length of the optical paths between the measurement interferometer 51 and the pair of corner cubes 3 and 4 illustrated in FIG. 4 are four times longer than the optical path length of the optical paths described in the first embodiment, and hence the displacement measurement resolution of the moving member 33 is four times higher than that in the first embodiment. Similarly, the optical path length of the optical paths between the correction interferometer 52 and the corner cube 4 is four times longer than the optical path length of the optical path described in the first embodiment, and hence the correction resolution of the refractive index of air is also four times higher than that in the first embodiment. In the fourth embodiment, the correction interferometer 52 and the pair of corner cubes 3 and 4 are provided on the moving member 33 and fixed thereto. Even when the moving member 33 moves, an actual distance traveled by the correction laser beam between the pair of corner cubes 3 and 4 is constant. That is, the corner cubes 3 and 4 are maintained at a constant distance. The moving member 33 is moved on the optical paths between the pair of corner cubes 3 and 4. In the fourth embodiment, the number of paths for interferometer is increased to provide the multipath interferometer, and hence the displacement measurement resolution and the refractive index correction resolution may be further improved as compared with the first embodiment.

In this embodiment, the measurement interferometer 51, the correction interferometer 52, the pair of corner cubes 3 and 4, and part of the corner cubes are provided on the moving member 33, and the other corner cubes 25 are fixed to the base member. However, the present invention is not limited to this. The measurement interferometer 51, the correction interferometer 52, the pair of corner cubes 3 and 4, and the part of the corner cubes 25 may be fixed to a base member, and the other corner cubes 25 may be provided on a moving member to be movable.

(Fifth Embodiment)

Figure 5:
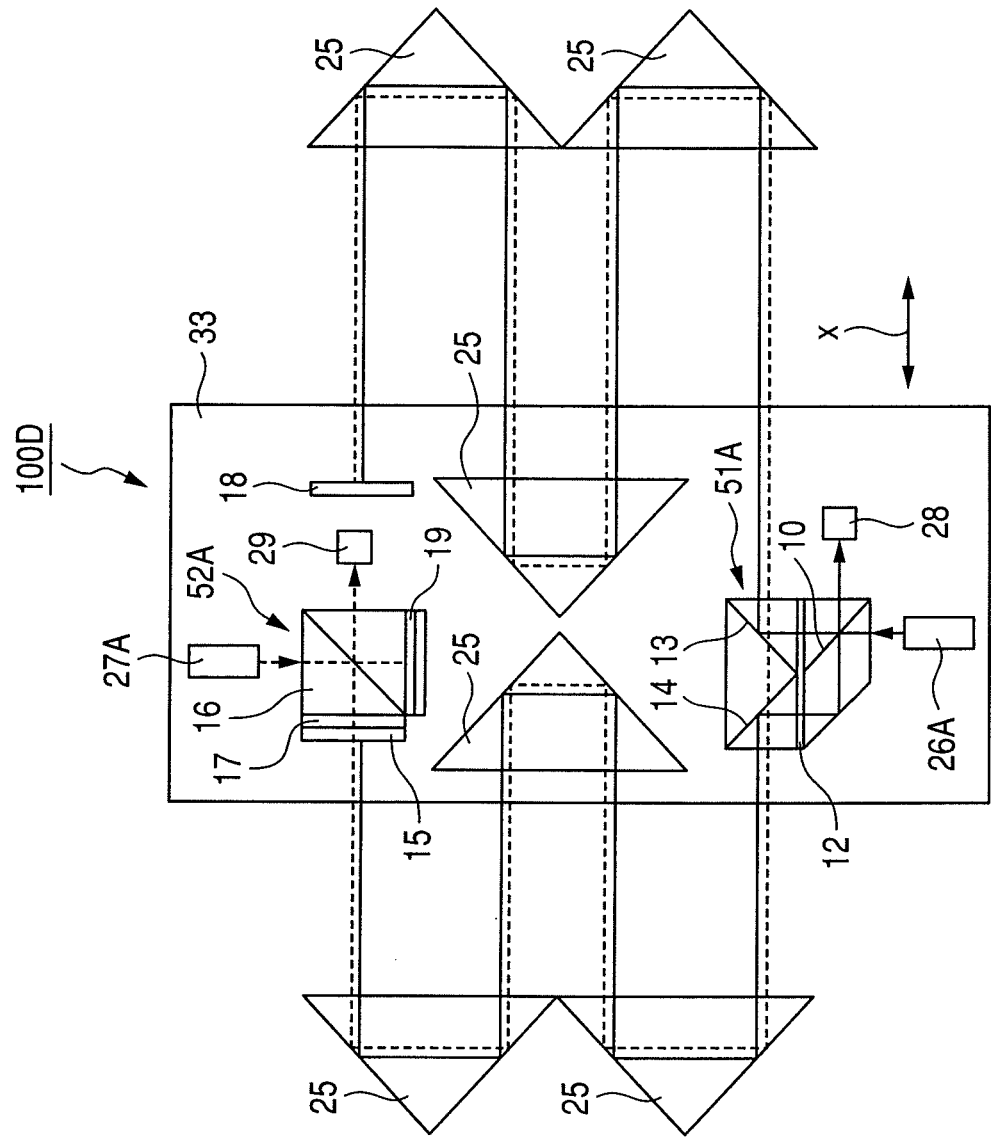
FIG. 5 illustrates a structure of a laser gauge interferometer according to a fifth embodiment of the present invention.

Next, referring to FIG. 5, a laser gauge interferometer 100D according to a fifth embodiment is described. In the fifth embodiment, the same structures as in the second embodiment are denoted by the same reference symbols and the description thereof is omitted. In the fifth embodiment, the laser gauge interferometer 100D includes multiple corner cubes 25 serving as intermediate reflection units in addition to the structure described in the second embodiment. In other words, the laser gauge interferometer 100D includes, as the multiple reflection units, the pair of mirrors 15 and 18 and the multiple (six) corner cubes 25. The multiple corner cubes 25 are arranged as in the fourth embodiment. On each of a first optical path and a second optical path, a light beam travels between the base member and the moving member 33 multiple times. The first optical path is an optical path in which the first measurement laser beam component reflected on the dichroic mirror 13 travels between the base member and the moving member 33 through the three corner cubes 25 multiple times, is reflected on the mirror 18, and travels between the base member and the moving member 33 through the three corner cubes 25 multiple times again to return to the dichroic mirror 13. The second optical path is an optical path in which the second measurement laser beam component reflected on the dichroic mirror 14 travels between the base member and the moving member 33 through the other three corner cubes 25 multiple times, is reflected on the mirror 15, and travels between the base member and the moving member 33 through the other three corner cubes 25 multiple times again to return to the dichroic mirror 14. Therefore, multiple paths are set for the measurement interferometer 51A and the correction interferometer 52A to improve the measurement resolutions of both the measurement interferometer 51A and the correction interferometer 52A. FIG. 5 illustrates an example in which the measurement interferometer is a differential eight-path interferometer and the correction interferometer is a four-path interferometer. The optical path length of the optical paths between the measurement interferometer 51A and the pair of mirrors 15 and 18 illustrated in FIG. 5 are four times longer than the optical path length of the optical paths described in the second embodiment, and hence the displacement measurement resolution of the moving member 33 is four times higher than that in the second embodiment. Similarly, the optical path length of the optical paths between the correction interferometer 52A and the plane mirror 18 is four times longer than the optical path length of the optical path described in the second embodiment, and hence the correction resolution of the refractive index of air is also four times higher than that in the second embodiment. In the fifth embodiment, the correction interferometer 52A and the pair of mirrors 15 and 18 are provided on the moving member 33 and fixed thereto. Even when the moving member 33 moves, an actual distance traveled by the correction laser beam between the pair of mirrors 15 and 18 is constant. That is, the pair of mirrors 15 and 18 are maintained at a constant distance. The moving member 33 is moved on the optical paths between the pair of mirrors 15 and 18. In the fifth embodiment, the number of paths for interferometer is increased to provide the multipath interferometer, and hence the displacement measurement resolution and the refractive index correction resolution may be further improved as compared with the second embodiment.

In this embodiment, the measurement interferometer 51A, the correction interferometer 52A, the pair of mirrors 15 and 18, and part of the corner cubes 25 are provided on the moving member 33, and the other corner cubes 25 are fixed to the base member. However, the present invention is not limited to this. The measurement interferometer 51A, the correction interferometer 52A, the pair of mirrors 15 and 18, and the part of the corner cubes 25 may be fixed to a base member, and the other corner cubes 25 may be provided on a moving member.

(Sixth Embodiment)

Figure 6:
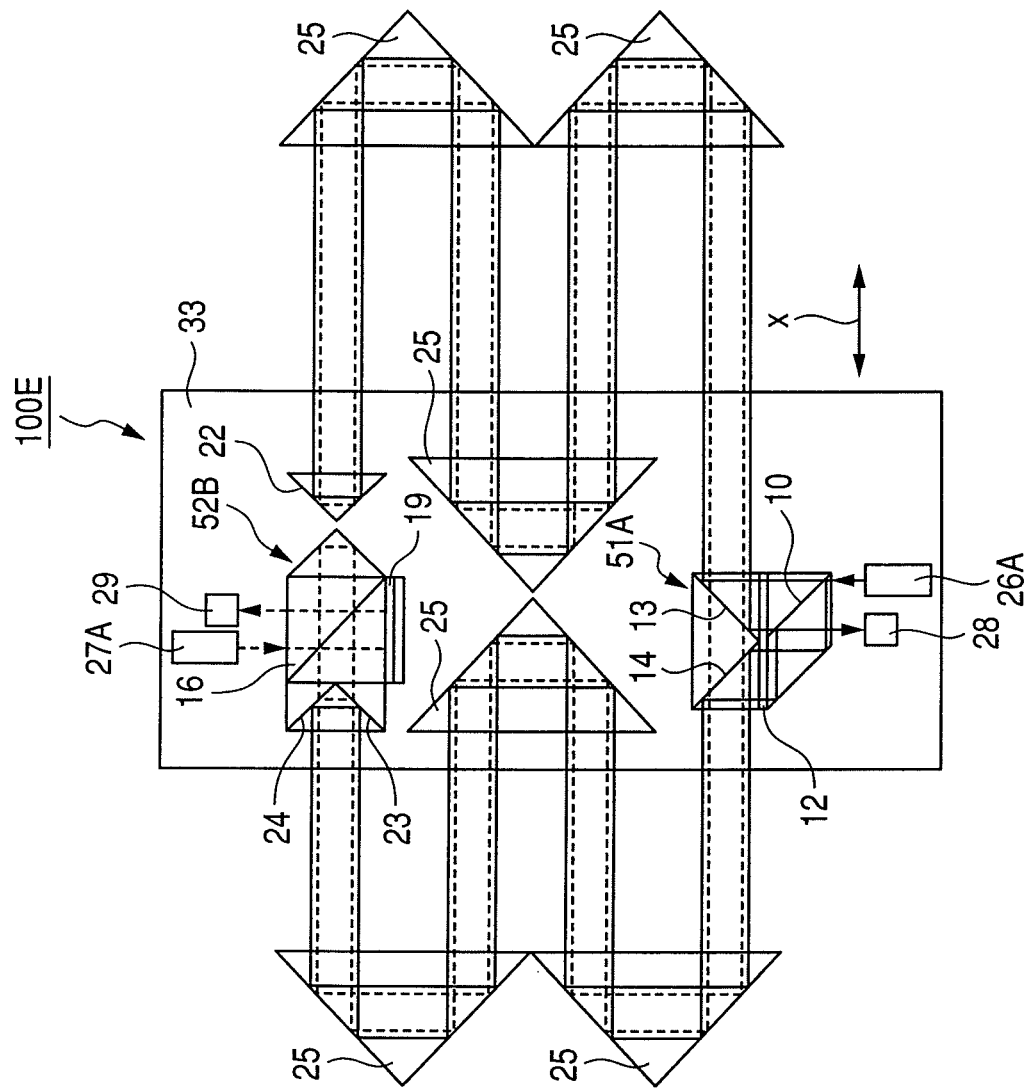
FIG. 6 illustrates a structure of a laser gauge interferometer according to a sixth embodiment of the present invention.

Next, referring to FIG. 6, a laser gauge interferometer 100E according to a sixth embodiment is described. In the sixth embodiment, the same structures as in the third embodiment are denoted by the same reference symbols and the description thereof is omitted. In the six embodiment, the laser gauge interferometer 100E includes multiple corner cubes 25 serving as intermediate reflection units in addition to the structure described in the third embodiment. In other words, the laser gauge interferometer 100E includes, as the multiple reflection units, the corner cube 22, the dichroic mirrors 23 and 24, and the multiple (six) corner cubes 25. The multiple corner cubes 25 are arranged as in the fourth and fifth embodiments. On each of a first optical path and a second optical path, a light beam travels between the base member and the moving member 33 multiple times. The first optical path is an optical path in which the first measurement laser beam component reflected on the dichroic mirror 13 travels between the base member and the moving member 33 through the three corner cubes 25 multiple times, is reflected by the corner cube 22, and travels between the base member and the moving member 33 through the three corner cubes 25 multiple times again to return to the dichroic mirror 13. The second optical path is an optical path in which the second measurement laser beam component reflected on the dichroic mirror 14 travels between the base member and the moving member 33 through the other three corner cubes 25 multiple times, is reflected on the dichroic mirrors 23 and 24, and travels between the base member and the moving member 33 through the other three corner cubes 25 multiple times again to return to the dichroic mirror 14. Therefore, multiple paths are set for the measurement interferometer 51A and the correction interferometer 52B to improve the measurement resolutions of both the measurement interferometer 51A and the correction interferometer 52B. FIG. 6 illustrates an example in which the measurement interferometer is a differential eight-path interferometer and the correction interferometer is a four-path interferometer. The optical path length of the optical paths between the measurement interferometer 51A, and the corner cube 22 and the dichroic mirrors 23 and 24 illustrated in FIG. 6 are four times longer than the optical path length of the optical paths described in the third embodiment, and hence the displacement measurement resolution of the moving member 33 is four times higher than that in the third embodiment. Similarly, the optical path length of the optical paths between the correction interferometer 52B, and the corner cube 22 is four times longer than the optical path length of the optical paths described in the third embodiment, and hence the correction resolution of the refractive index of air is also four times higher than that in the third embodiment. In the sixth embodiment, the correction interferometer 52B, the corner cube 22, and the dichroic mirrors 23 and 24 are provided on the moving member 33 and fixed thereto. Even when the moving member 33 moves, an actual distance traveled by the correction laser beam between the corner cube 22 and the dichroic mirrors 23 and 24 is constant. The moving member 33 is moved on the optical paths between the corner cube 22 and the dichroic mirrors 23 and 24. In the sixth embodiment, the number of paths for interferometer is increased to provide the multipath interferometer, and hence the displacement measurement resolution and the refractive index correction resolution may be further improved as compared with the third embodiment.

In this embodiment, the measurement interferometer 51A, the correction interferometer 52B, the corner cube 22, the dichroic mirrors 23 and 24, and part of the corner cubes 25 are provided on the moving member 33, and the other corner cubes 25 are fixed to the base member. However, the present invention is not limited to this. The measurement interferometer 51A, the correction interferometer 52B, the corner cube 22, the dichroic mirrors 23 and 24, and the part of the corner cubes 25 may be fixed to a base member, and the other corner cubes 25 may be provided on a moving member.

(Seventh Embodiment)

Next, referring to FIG. 7, a machining apparatus and a machining method according to a seventh embodiment are described.

FIG. 7 is a perspective view of a machining apparatus of the present invention. In a machine tool illustrated in FIG. 7, a Y slider 62 is held on a base 61 so as to be movable in a Y direction by a driving unit such as a linear motor (not shown). An X slider 63 is held on the Y slider 62 so as to be movable in an X direction by a driving unit such as a linear motor (not shown). A workpiece 65 is held on the X slider 63. A relative position of the Y slider 62 with respect to the base 61 is measured by a laser gauge interferometer of the present invention including a measurement interferometer 67 fixed on the Y slider 62 and a correction interferometer 68 fixed on the base 61. Accordingly, a relation between the Y slider 62 and the base 61 is the same as the relation between the moving member and the base member in the other embodiments. Similarly, a relative position of the X slider 63 with respect to the Y slider 62 is measured by another laser gauge interferometer of the present invention including a measurement interferometer 69 fixed on the X slider 63 and a correction interferometer 70 fixed on the Y slider 62. Accordingly, a relation between the X slider 63 and the Y slider 62 is the same as the relation between the moving member and the base member in the other embodiments. Further, in this embodiment, a tool 66 is movable in a Z direction by means of a Z stage including a Z slider 64 and a driving unit such as a linear motor (not shown). The Z slider 64 includes, similarly to the Y slider 62, still another laser gauge interferometer of the present invention including a measurement interferometer 71 fixed on the Z slider 64 and a correction interferometer 72 fixed on the base 61, and the driving unit such as the linear motor (not shown). Accordingly, a relation between the Z slider 64 and the base 61 is the same as the relation between the moving member and the base member in the other embodiments.

In this embodiment, the relative position of the Y slider 62 with respect to the base 61 is measured by the laser gauge interferometer of the present invention, and the driving unit such as the linear motor (not shown) is driven by such a control method as proportional/integral/derivative (PID) control based on a measurement value of the laser gauge interferometer to position the Y slider 62 with respect to the base 61. The relative position of the Y slider 62 with respect to the base 61 is measured with high precision by correcting, by the correction interferometer 68, an error due to a change in refractive index of air contained in a measurement value of the measurement interferometer 67. A measurement beam 73 irradiated from the measurement interferometer 67 passes through the same optical path in air as a correction beam 74 irradiated from the correction interferometer, and hence the measurement error due to the change in refractive index of air may be corrected with significantly high precision. Therefore, the Y slider 62 may be positioned with high precision without being affected by the change in refractive index of air. Similarly, the X slider 63 and the Z slider 64 may be positioned with high precision based on measurement values of the laser gauge interferometers of the present invention. Therefore, in this embodiment, the Z stage on which the tool 66 is held and an XY stage on which the workpiece 65 is held are positioned with high precision by using the laser gauge interferometers of the present invention, with the result that relative positions of the tool 66 and the workpiece 65 may be controlled with high precision to thereby machine the workpiece 65 with high precision. Further, machining may be performed also by interchanging the arrangement of the tool 66 and the workpiece 65.

Referring to FIG. 7, a specific example of machining performed by the machining apparatus using the laser gauge interferometers of the present invention is described. As a first machining example, cutting of a lens mold is described. The tool 66 is a round-point diamond bite attached to a spindle, and the workpiece 65 is a mold material obtained by electroless nickel plating an iron base material. The spindle is rotated to spin the bite at high speed. The mold material is scanned in the X and Y directions, and the bite is scanned in the Z direction. The depth of cut of the bite is controlled with high precision based on the measured position values of the laser gauge interferometers of the present invention to perform the cutting, with the result that the lens mold may be machined with high precision. As a second machining example, polishing of a lens is described. The tool 66 is a polishing tool such as a urethane pad, and the workpiece 65 is a lens base material. The polishing tool is scanned while being pressed against the lens base material at light load in a polishing solution to perform the polishing. The machining apparatus of the present invention may be applied to all machining methods involving mechanically positioning at least one of the tool and the workpiece, and examples of the machining methods include cutting, grinding, polishing, blasting such as water jet blasting, plasma arc machining, electrical discharge machining, electron beam machining, laser machining, and exposure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-192259, filed on Aug. 21, 2009, which is hereby incorporated by reference herein in its entirety.

What is claimed is:

1. A laser gauge interferometer for measuring a displacement amount of a moving member relative to a base member, comprising:
   a measurement laser light source for emitting a measurement laser beam;
   a measurement laser beam dividing unit for dividing the measurement laser beam into a first measurement laser beam and a second measurement laser beam;
   a correction laser light source for emitting a correction laser beam;
   a correction laser beam dividing unit for dividing the correction laser beam into a first correction laser beam and a second correction laser beam;
   a first reflection unit and a second reflection unit provided to cause the first measurement laser beam to pass through a first optical path, to cause the second measurement laser beam to pass through a second optical path and to cause the first correction laser beam to pass through a third optical path,
   wherein the first optical path and the second optical path have an optical path length changed based on a displacement of the moving member, and at least a part of the first optical path and/or at least a part of the second optical path passes through air;
   wherein the third optical path has an optical path common to the first optical path and the second optical path;
   wherein the second reflection unit is provided adjacent to the correction laser beam dividing unit such that a fourth optical path which the second correction laser beam passes through does not pass through air;
   a measurement interferometer for causing the first measurement laser beam and the second measurement laser beam to interfere with each other, to generate a measurement interference beam; and
   a correction interferometer for causing the first correction laser beam and the second correction laser beam as a reference light beam to interfere with each other, to generate a correction interference beam.

2. The laser gauge interferometer according to claim 1, wherein the measurement laser beam dividing unit comprises a polarization beam splitter, the polarization beam splitter dividing the measurement laser beam into two and transmitting the first correction laser beam.

3. The laser gauge interferometer according to claim 1, wherein:
   the measurement laser beam dividing unit comprises a polarization beam splitter; and
   the laser gauge interferometer further comprises a pair of dichroic mirrors for reflecting the first measurement laser beam and the second measurement laser beam, which are obtained by dividing the measurement laser beam into two by the polarization beam splitter, in opposite directions.

4. The laser gauge interferometer according to claim 3, wherein the measurement laser beam and the correction laser beam have different frequencies.

5. The laser gauge interferometer according to claim 1, further comprising multiple reflection units provided to be opposed to the base member and the moving member so that the first measurement laser beam and the second measurement laser beam travel back and forth between the base member and the moving member one or more times.

6. A machining apparatus, comprising:
   a tool;
   a holder for holding a workpiece to be machined by the tool;
   a moving member on which one of the tool and the holder is held;
   a base member for holding the moving member to be movable; and
   the laser gauge interferometer according to claim 1 for measuring a displacement amount of the moving member relative to the base member.

7. A method of manufacturing a workpiece, comprising:
   measuring a displacement of a moving member on which one of a tool and the workpiece is held, by causing a first measurement laser beam and a second measurement laser beam to interfere with each other, the first measurement laser beam and the second measurement laser beam having an optical path length changed based on the displacement of the moving member;
   measuring a change in refractive index of air in a measurement value of the displacement of the moving member by causing a first correction laser beam and a second correction laser beam as a reference light beam to interfere with each other, the first correction laser beam passing through a third optical path common to at least a part of a first optical path through which the first measurement laser beam passes and a second optical path through which the second measurement laser beam passes, and the second correction laser beam passing through a fourth optical path which does not pass through air; and correcting the displacement of the moving member by correcting a measurement value of the displacement of the moving member based on a measurement value of the change in refractive index of air.

8. A method of manufacturing a workpiece according to claim 7, wherein plural moving members exist.

9. A method of manufacturing a workpiece according to claim 8, wherein the
plural moving members are X stage and Y stage.

* * * * *